(12) United States Patent
Marche

(10) Patent No.: US 7,784,735 B2
(45) Date of Patent: Aug. 31, 2010

(54) AIRCRAFT POD AND AIRCRAFT EQUIPPED WITH AT LEAST ONE SUCH POD

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/994,205

(22) PCT Filed: Jun. 26, 2006

(86) PCT No.: PCT/FR2006/001475

§ 371 (c)(1),
(2), (4) Date: Jul. 31, 2008

(87) PCT Pub. No.: WO2007/003749

PCT Pub. Date: Jan. 11, 2007

(65) Prior Publication Data

US 2009/0121078 A1 May 14, 2009

(30) Foreign Application Priority Data

Jun. 30, 2005 (FR) .................................. 05 51858

(51) Int. Cl.
*F02K 1/54* (2006.01)
(52) U.S. Cl. ................................................. 244/110 B
(58) Field of Classification Search ............. 244/110 B, 244/173.3, 158 R
See application file for complete search history.

(56) References Cited

U.S. PATENT DOCUMENTS

| 2,847,823 | A | * | 8/1958 | Brewer | 239/265.29 |
|---|---|---|---|---|---|
| 3,279,182 | A | * | 10/1966 | Helmintoller | 60/226.2 |
| 3,492,821 | A | * | 2/1970 | Monaghan et al. | 60/229 |
| 3,856,239 | A | * | 12/1974 | Leibach | 244/12.5 |
| 5,176,340 | A | * | 1/1993 | Lair | 244/110 B |
| 5,230,213 | A | * | 7/1993 | Lawson | 60/226.2 |
| 5,309,711 | A | * | 5/1994 | Matthias | 60/226.2 |
| 5,372,006 | A | * | 12/1994 | Lair | 60/226.2 |
| 5,392,991 | A | * | 2/1995 | Gatti et al. | 239/265.29 |
| 5,396,762 | A | * | 3/1995 | Standish | 60/226.2 |
| 5,598,701 | A | * | 2/1997 | Newton | 60/226.2 |
| 5,671,598 | A | * | 9/1997 | Standish | 60/226.2 |
| 5,794,433 | A | * | 8/1998 | Peters et al. | 60/226.2 |
| 5,937,636 | A | * | 8/1999 | Gonidec et al. | 60/226.2 |
| 6,487,845 | B1 | * | 12/2002 | Modglin et al. | 60/226.2 |

(Continued)

FOREIGN PATENT DOCUMENTS

EP 0728934 A1 8/1996

(Continued)

*Primary Examiner*—Timothy D Collins
*Assistant Examiner*—Justin Benedik
(74) *Attorney, Agent, or Firm*—Perman & Green LLP

(57) ABSTRACT

A pod for an aircraft including a cowling, an engine housed in the inner volume of the cowling, an annular channel circulating a secondary thrust flow arranged between the engine and the cowling, and at least one thrust reverser for forming a reverse flow from the secondary thrust flow circulating in the annular channel. The thrust reverser including a plurality of doors provided in the rear part of the cowling, so as to form a trailing edge of the cowling. The thrust reverser can include means for actuating the doors such that at lease one actuating means actuates two adjacent doors and at least one door is actuated by two actuating means.

14 Claims, 4 Drawing Sheets

U.S. PATENT DOCUMENTS 6,976,352 B2 * 12/2005 Lair .......................... 60/226.2
2005/0001095 A1 * 1/2005 Christensen ............ 244/110 B

FOREIGN PATENT DOCUMENTS

| | | | |
|---|---|---|---|
| EP | 0756078 A1 | 1/1997 |
| EP | 0851111 A1 | 7/1998 |
| FR | 2120172 A1 | 8/1972 |

* cited by examiner

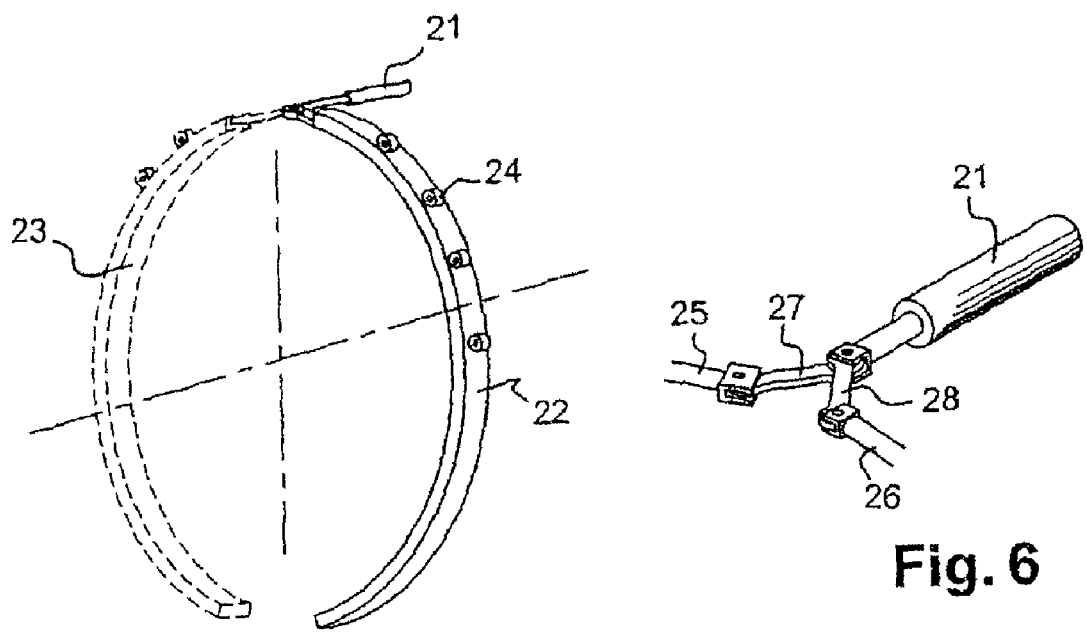
Fig. 5
Fig. 6
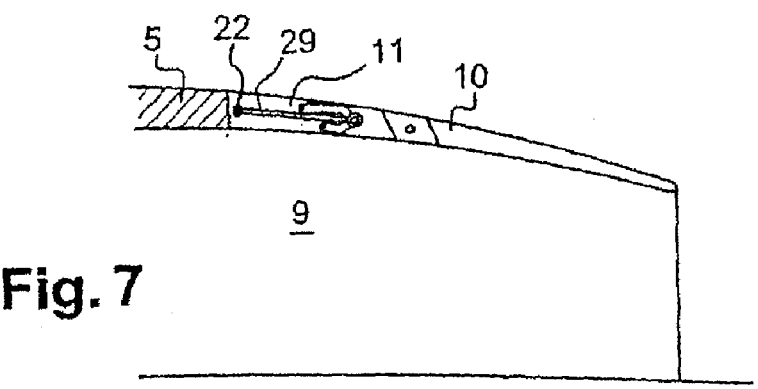
Fig. 7
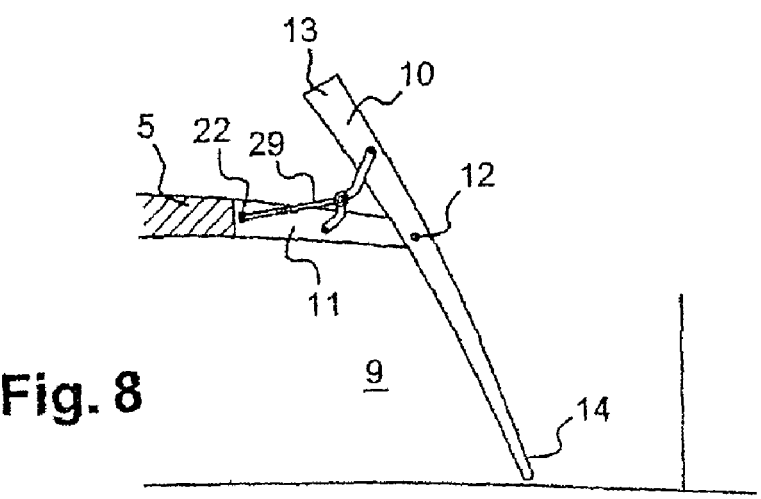
Fig. 8

AIRCRAFT POD AND AIRCRAFT EQUIPPED WITH AT LEAST ONE SUCH POD

CROSS REFERENCE TO RELATED APPLICATIONS

This application is the National Stage of International Application No. PCT/FR2006/001475, International Filing Date, 26 Jun. 2006, which designated the United States of America, and which International Application was published under PCT Article 21 (2) as WO Publication No. WO2007/003749 and which claims priority from French Application No. 0650324, filed on 30 Jun. 2005, the disclosures of which are incorporated herein by reference in their entireties.

BACKGROUND

1. Field

The disclosed embodiments relate to the aeronautical field. The subject of the disclosed embodiments is an aircraft nacelle. More precisely, the subject of the disclosed embodiments is a thrust reverser for forming a reverse flow from a secondary thrust flow in the nacelle. The disclosed embodiments also relate to an aircraft fitted with at least one such nacelle.

2. Summary

In general, a nacelle comprises a cowling in which an engine is housed. Air is drawn into the nacelle at a front end of said nacelle, located forward of the aircraft. The nacelle discharges the absorbed air, at high velocity, toward the rear of the aircraft. To allow the aircraft to be propelled, it is necessary for the mass of air passing through the nacelle to have a higher exit velocity than the entry velocity. The exit velocity of the mass of air is increased in a known manner within the actual nacelle.

The air passing through the nacelle is made up of two different flows. A first flow, called primary flow, passes through the engine. The primary flow is ejected directly to the nacelle from the rear of the engine. A second flow, called secondary flow, passes through an air flow channel, before being ejected out of the nacelle. The air flow channel is provided between an internal wall of the nacelle cowling and an external wall of the engine and extends along said engine.

Upon landing, the aircraft applies mechanical brakes for mechanically braking said aircraft. However, once the aircraft is on the ground, it is known to use, in addition to mechanical brakes, thrust reversers. The thrust reversers in particular shorten the landing distance of the aircraft. The term "landing distance" of the aircraft is understood to mean the distance traveled by the aircraft between the moment the landing gear of the aircraft touches the runway and the moment when the aircraft is completely at rest on the runway. The thrust reversers deflect all or some of the air flows leaving at the rear of the nacelle so as to eject them toward the front of the aircraft. The thrust reversers thus create an aerodynamic drag and therefore a braking force called "counter-thrust" force, which contributes to slowing down the aircraft.

As thrust reversers, pivoting-door thrust reversers are known. A nacelle fitted with such a system has doors provided in a thickness of the cowling of the nacelle in a central region of said nacelle. The doors are distributed over a circumference of the nacelle. Such thrust reversers with two doors, each door following a semi-circumference of the cowling, and those having four doors, each door then following one quarter of the circumference of the cowling, are known. In the inactive position, the doors are closed, that is to say they extend over a prolongation of the cowling. In the active position, the doors are open and the pivot axis of the doors is away from the ends of said doors. The deflection of the doors is such that a front part of the doors then extends toward the outside of the nacelle, in a direction approximately perpendicular to a longitudinal axis of said nacelle, and a rear part is housed in the nacelle, so as to at least partly close off the air flow channel. The outflow of air is then blocked and the flow of air is discharged out of the nacelle via the orifices exposed by opening the doors. The front part of the doors, is understood out of the nacelle, enables the flow to be directed toward the front of the nacelle. Such a thrust reverser makes it possible to reverse the thrust arising from only the secondary flow, the openings being made upstream of the primary flow.

One drawback of such a thrust reverser is that it is difficult to maintain an aerodynamic profile on the internal face and on the external face of the cowling at the position of the doors of the reverser. This is because the internal face of the cowling includes means for opening and closing the doors of the reverser, and possibly locking means. In addition, seals are provided along the doors so as to prevent any leakage of air from the nacelle cowling when the doors are closed. All of these devices tend to disturb the flow of air in the cowling.

A thrust reverser having doors for deflecting both the primary air flow and the secondary air flow is also known. The doors of such a thrust reverser are provided on a nozzle of the engine, at the rear end of the engine. When the doors are closed, they extend along the prolongation of the engine and do not disturb either the primary air flow or the secondary air flow. When the doors are open, they close off not only the flow channel for the secondary air flow but also the outlet for the primary air flow in the engine. There also exists a thrust reverser whose doors are provided on the engine nozzle so as to deflect only one of the two flows.

The pivoting doors of the thrust reversers, and in particular those provided on nozzles may deform due to the large distortions to which they are subjected. This is because the air flows through the nacelle under pressure. Moreover, the cowling wall or the nozzle wall is weakened in the region where the doors of the thrust reverser are provided. In addition, the doors of the thrust reversers have a large deformation area, since each door of the reverser represents one half or one quarter of the circumference of the cowling or of the nozzle.

The disclosed embodiments claim to provide a novel thrust reverser with doors for deflecting the secondary thrust flow, which makes it possible to solve the problems relating to the aerodynamic profile of the nacelle and the problems due to deformation of the doors of the thrust reversers such as those currently existing in the prior art.

To do this, the doors of the thrust reverser according to the disclosed embodiments are produced at the rear end of the cowling, forming the trailing edge of said cowling. The term "trailing edge" is understood to mean in general the rear part of an aerodynamic profile. Thus, the number of internal interfaces needed between the doors and the cowling is reduced, especially as regards the seals, since these are necessary only on the front part of the doors. The term "front part" of the doors is understood to mean that part of the doors located upstream of the pivot axis of said doors relative to the flow direction of the thrust flow. The doors are arranged as two circular arcs placed on either side of the circular flow channel for the thrust flow so as to follow substantially an external perimeter of the channel. The doors of the thrust reverser forming the trailing edge of the cowling are closely juxtaposed so that, in the closed position, there is no gap between two doors placed side by side. The expression "placed side by side" is understood to mean that two adjacent doors are juxtaposed, one beside the other, over the entire length of said doors. Advantageously, the thrust reverser according to the disclosed embodiments have a large number of doors uniformly distributed over the perimeter of the cowling, each door having a small area. Thus, the number of doors is no longer two or four, but instead six, eight, ten, twelve or even sixteen or more arranged in a ring on the external periphery of the flow channel for the thrust flow. By reducing the area of each door, the risk of said doors deforming is reduced. When the doors are in the closed position, they extend along the prolongation of the cowling, forming an actual part of said cowling. When the doors are in the open position, they swing out so that a rear part of said doors is housed in the circular flow channel for the secondary thrust flow, so as to block the thrust flow and to expel a reverse secondary air flow out of the nacelle. The term "rear part" of the doors is understood to mean that part located downstream of the pivot axis of the doors. In a preferred embodiment, the doors are connected to the fixed structure of the cowling via fixed beams extending along the prolongation of the cowling. The beams are distributed over the entire perimeter of the cowling. Thus, there is a fixed beam between each pair of adjacent doors, each of these two doors being fastened to said beam. The beams extend for example between an internal wall and an external wall of the cowling, over the entire length of said cowling, including the trailing edge. Since the fixed beams are located between the internal wall and the external wall of the cowling, and along the prolongation of said cowling, they do not impede flow of air. The doors are mounted so as to rotate on the fixed beams. More precisely, each door is mounted so as to rotate on two beams, so as to be able to pivot about a rotation axis passing through these two beams. Advantageously, the doors cover the beams when they are in the closed position.

The disclosed embodiments also relate to a control system for the synchronized opening and closing of a plurality of doors, especially the doors of a thrust reverser. This control system includes actuation means that can be attached to fixed beams extending longitudinally along the prolongation of the doors, a beam being placed between two adjacent doors. Thus, each actuation means may open and close two adjacent doors mounted so as to rotate on either side of one and the same beam. Two adjacent doors actuated by the same actuation means cannot be opened independently of each other. A central door may be boarded by two different doors, each extending along an opposed side of the central door. This central door, flanked by two doors, may therefore be actuated by two different actuation means, each actuating two doors. Thus, the control system ensures that all of the doors are opened and closed smoothly in synchronism. In the case of a thrust reverser, since the actuation means are mounted on the fixed beams there is absolutely no obstruction to the flow of air in the air flow channel.

The subject of the disclosed embodiments are therefore an aircraft nacelle comprising a cowling, an engine housed in an internal volume of the cowling, an annular flow channel for a secondary thrust flow, provided between the engine and the cowling, and at least one thrust reverser for forming a reverse flow from the secondary thrust flow circulating in the annular channel, characterized in that the thrust reverser comprises a plurality of doors provided in a rear part of the cowling, so as to form a trailing edge of said cowling.

According to particular embodiments, the nacelle may have some or all of the following additional features:

the nacelle includes static link rods linking the doors to the cowling, the doors being mounted so as to rotate on the static link rods;

at least one link rod links two adjacent doors;

the link rods are covered by the doors in the closed position;

the thrust reverser includes actuation means for actuating the doors, at least one actuation means actuating two adjacent doors and at least one door being actuated by two actuation means;

at least one actuation means is mounted on a link rod;

at least one actuation means comprises a double-acting cylinder having two actuating rods, one end of each rod being fastened to a door;

the thrust reverser includes rotary means capable of rotating about the axis of the engine, actuation means being mounted on the rotary means so as to actuate the doors on rotation of the rotary means;

the doors are provided with an acoustic coating;

the thrust reverser comprises eight doors;

the thrust reverser comprises sixteen doors; and the doors are identical to one another and are interchangeable.

The disclosed embodiments also relate to an aircraft comprising at least one nacelle according to the disclosed embodiments.

The disclosed embodiments will be more clearly understood on reading the following description and on examining the figures that accompany it. These are given by way of indication and imply no limitation of the disclosed embodiments. The figures show:

BRIEF DESCRIPTION OF THE DRAWINGS

FIGS. 5, 6, 7 and 8: a schematic representation of one example of an actuation means for opening the doors of a thrust reverser according to the disclosed embodiments.

DETAILED DESCRIPTION OF THE DRAWINGS

Figure 1A:
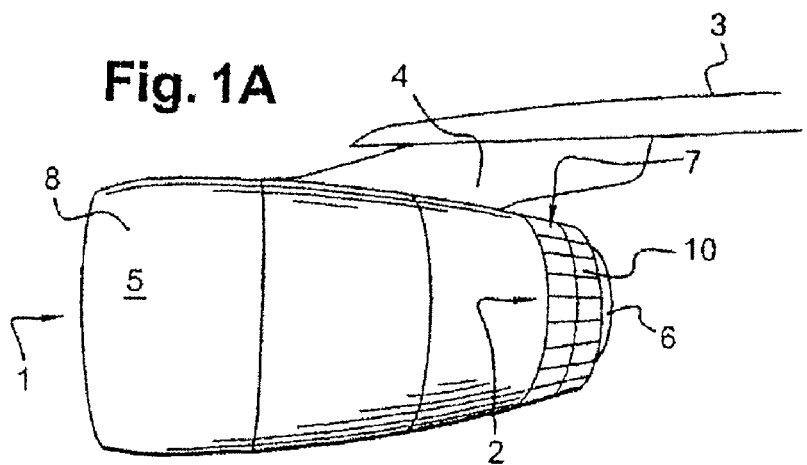
FIGS. 1A and 1B: a schematic representation in side view of a nacelle fitted with a thrust reverser according to the disclosed embodiments in the closed position (FIG. 1A) and in the open position (FIG. 1B)

FIG. 1A shows a nacelle 1 fitted with a thrust reverser 2 according to the disclosed embodiments.

The nacelle 1 is linked to a wing 3 of an aircraft (not shown) by a fastening mast 4. The nacelle 1 comprises a cowling 5 and an engine 6 housed in said cowling 5. An annular channel is provided between the cowling 5 and the engine 6. A secondary thrust flow passes through said channel, from a front end 8 of the cowling to a rear end 7 of said cowling 5, at which point the secondary thrust flow is ejected from the nacelle. The thrust reverser 2 is provided at the rear end 7 of the cowling 5 and thus forms the trailing edge of the cowling 5.

Figure 1B:
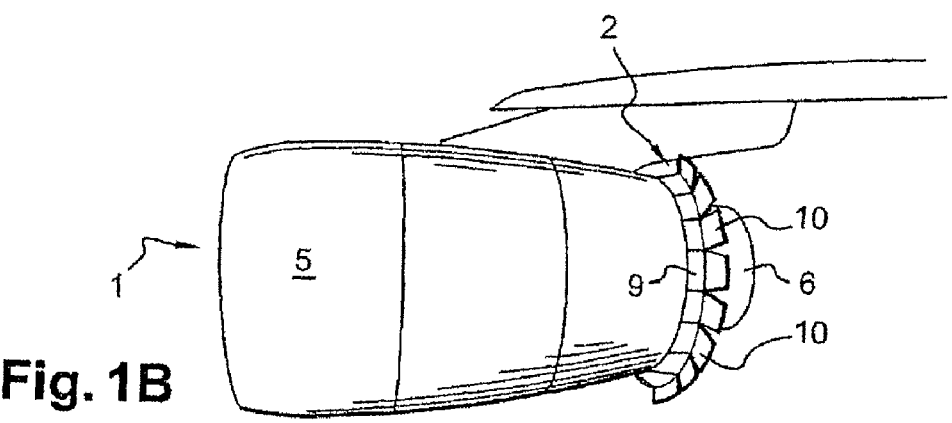
Figure 2A:
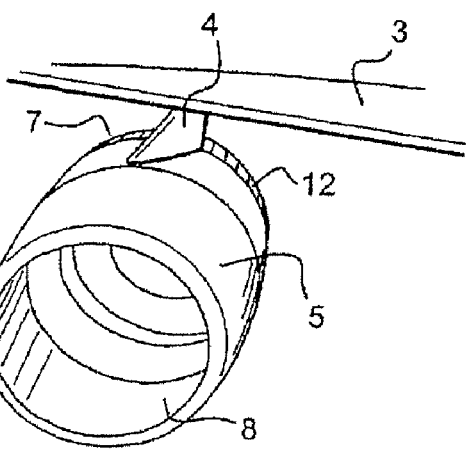
FIGS. 2A and 2B: a schematic representation in front view of the nacelle fitted with the thrust reverser according to the disclosed embodiments in the closed position (FIG. 2A) and in the open position (FIG. 2B)
Figure 2B:
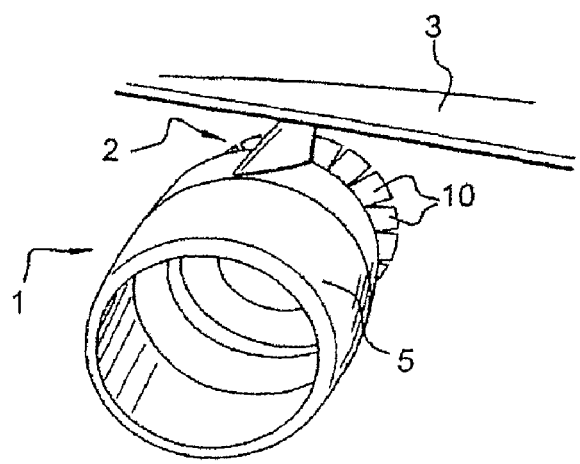
Figure 3A:
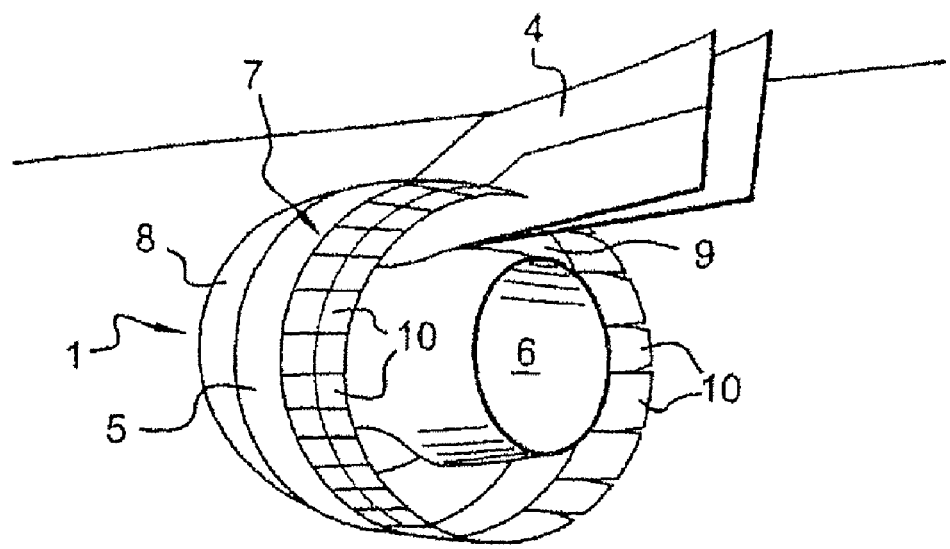
FIGS. 3A and 3B: a schematic representation in rear view of the nacelle fitted with the thrust reverser according to the disclosed embodiments in the closed position (FIG. 3A) and in the open position (FIG. 3B)
Figure 3B:
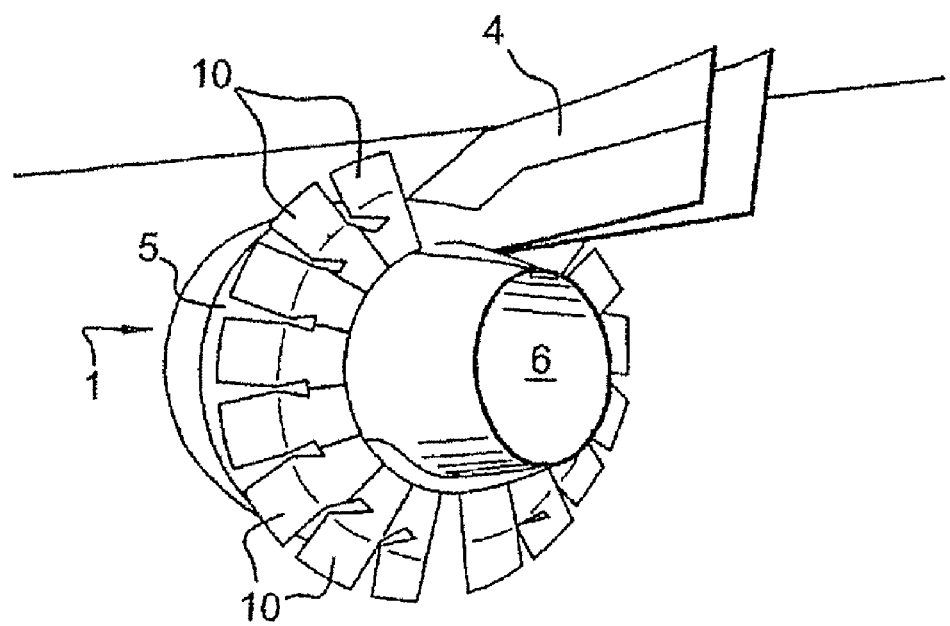

In the closed position, as shown in FIGS. 1A, 2A and 3A, the doors 10 of the thrust reverser 2 extend along the prolongation of the cowling 5 so as to form the rear end 7 of said cowling 5. In the open position, as shown in FIGS. 1B, 2B and 3B, the doors 10 extend radially from the cowling 5 over the entire circumference of said cowling so as to close off the air flow channel 9. When the thrust reverser 2 of the disclosed embodiments are open, the thrust flow is blocked at the rear end 7 of the cowling 5, forcing the flow of air to be expelled toward the front of the nacelle 1, thus forming a reverse flow capable of braking the aircraft fitted with the nacelle 1.

The doors 10 are arranged in two circular arcs, each circular arc following an external semi-circumference of the cowling 5, so as to form a left flank and a right flank of the rear end, or rear part, 7 of the cowling 5. Each door 10 is juxtaposed to at least one other door 10 lying on the same circular arc, so that, in the closed position, there is no gap between two adjacent doors 10 that could allow the thrust flow to escape from the nacelle 1. The doors 10 are juxtaposed via their sides, which are perpendicular to the pivot axis of said doors 10. Each door 10 is of small dimensions since a thrust reverser advantageously comprises at least eight doors distributed in groups of four on each flank of the cowling 5.

In one particular embodiment, all the doors 10 may be identical and interchangeable so as to make it easier to manufacture the thrust reverser 2 according to the disclosed embodiments and to mount it. It therefore suffices to produce a single prototype of a door 10 for an engine and a given number of doors per reverser. Moreover, it is also easier to mount the thrust reverser 2 since there is no risk of reversing the position of two doors. Accordingly, the external wall of the doors 10 of the thrust reverser 2 must be concentric with the axis of the engine. It is also possible to provide for only the internal, acoustic and mechanical, part of the doors 10 to be interchangeable. The doors 10 are then produced in two separable parts, namely an internal part, i.e. one directed toward the engine 6, and an external part, i.e. one turned toward the outside of the nacelle 1. The external part itself may differ from one door 10 to another.

As will be described in greater detail below, the doors 10 of the thrust reverser 2 according to the disclosed embodiments may be opened simultaneously by actuation means of said doors 10. Thus, although the number of doors 10 of the thrust reverser 2 according to the disclosed embodiments may be large compared with the number of doors in the thrust reversers of the prior art, the simultaneous opening and closing of the doors 10 of the thrust reverser 2 is guaranteed.

The position of the thrust reverser 2 at the rear end 7 of the cowling 5 makes it easier to produce said thrust reverser 2. This is because, in the closed position, the doors 10 of the thrust reverser 2 must not allow the secondary thrust flow to escape from the nacelle 5 at the longitudinal join between two adjacent doors. To achieve this, it is necessary to place seals between each pair of adjacent doors 10. The seals extend over the length of the doors 10 so as to seal the gaps between the adjacent longitudinal edges of said doors 10. The term "length" or "longitudinal edge" of a door is understood to mean the dimension of the door parallel to the axis of the engine. Owing to the kinematics of the doors 10, and especially of the pivot link between the doors 10 and the nacelle 5, it may be difficult to produce these interfaces. By providing the doors 10 at the trailing edge 7 of the nacelle 5, it is unnecessary to place seals over the entire length of the doors 10, but only at the front part of said doors 10 forming the part located out of the nacelle 5 when the doors 10 are open. This is because the rear part of the doors 10, which is intended to be housed in the flow channel 9 for the thrust flow when the doors are open, need not be provided with a seal since it forms, in any case, the trailing edge 7 of the nacelle 5 via which the thrust flow is ejected from the nacelle 1.

In FIGS. 4A, 4B, 4C and 4D it may be seen that each door 10 is linked on the one hand to an adjacent door 10 and, on the other hand, to the nacelle 5 via a static link rod 11. The static link rod 11 extends along the prolongation of the cowling 5, parallel to the axis of the engine. Two adjacent doors 10 are linked by a pivot 12 at the rear end of a link rod 11. The link rod 11 is mounted fixedly with respect to the cowling 5. In a preferred embodiment, the link rods 11 extend between an internal wall and an external wall of the cowling 5, over the entire length of said cowling 5 including the rear end 7. Thus, the rods 11 do not disturb the air flow, either in the air flow channel or outside the nacelle 1. Moreover, the link rods 11 are guaranteed to have a certain rigidity owing to their long length. Of course, it is possible to attach the link rods 11 to the cowling 5, for example by welding the front end of the rods 11 to the wall of the cowling 5, at the location of an interface between the rear end 7 and the central part of said cowling 5.

Figure 4A:
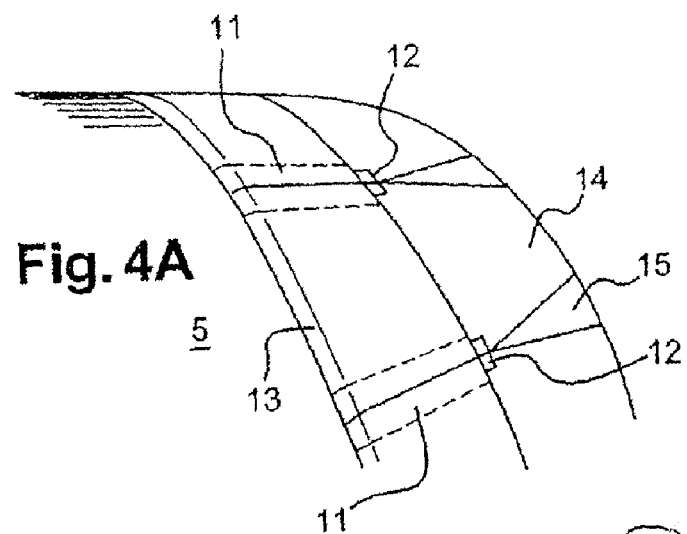
FIGS. 4A, 4B, 4C and 4D: an enlargement of a nacelle in the region of the doors of a thrust reverser according to the disclosed embodiments during various phases of opening said doors.
Figure 4B:
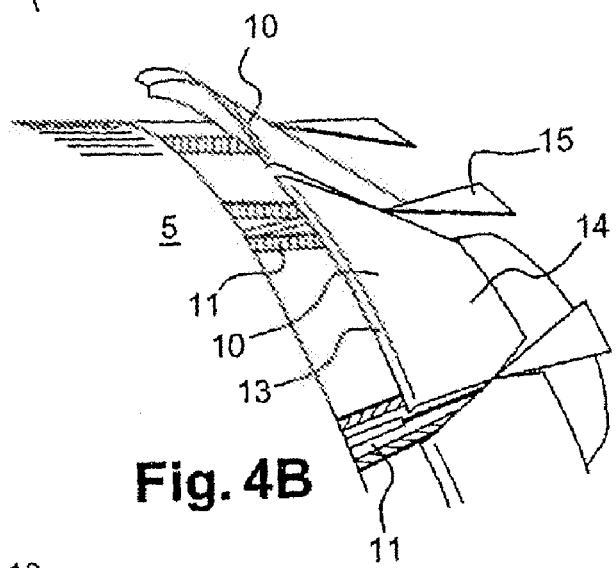
Figure 4C:
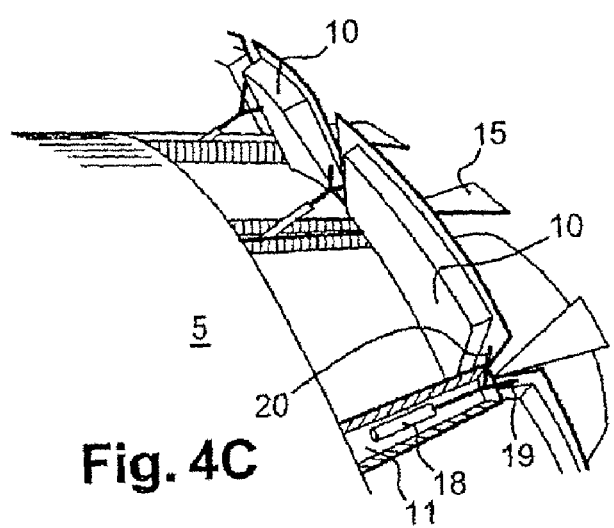
Figure 4D:
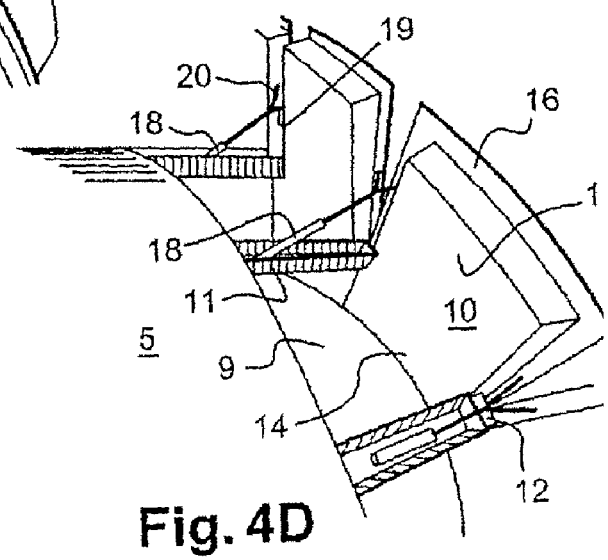

Each door 10 is capable of moving about the pivot 12 of a link rod 11. The movement of the doors 10 is such that they may have at least one stable closed position (FIG. 4A) and at least one stable open position (FIG. 4D). Each door 10 is mounted so as to pivot on two static link rods 11. Likewise, a static link rod 11 may be linked to two adjacent doors 10. The link rods 11 that are located at the ends of two circular arcs forming the flanks of the trailing edge 7 of the cowling 5 are linked only to a single door 10, which is itself located at one end of one of said circular arcs. In the closed position, the external wall 16 of the doors 10 cover the link rods 11 (FIG. 4A).

The width of the front part 13 of a door 10 is greater than the width of the rear part 14 of said door 10, so as to allow the rear part 14 of the doors 10 to move toward the inside of the cowling 5. The terms "front" and "rear" are understood to mean with respect to the direction of flow of the thrust flow in the annular channel. The term "width" of the door 10 is understood to mean the dimension of said door 10 along the circumference of the cowling 5, perpendicular to the axis of the engine. Since the thrust flow has to be channeled over the entire length of the flow channel 9 for the thrust flow, it is necessary for this difference in width of the doors 10 not to be perceptible when the thrust reverser 2 is in the closed position. It is therefore possible to provide a butterfly 15 between the rear parts 14 of the doors 10, the shape of the butterfly 15 following the contour of said rear parts 14 at the point of the joins between the doors 10. The butterflies 15 thus close the cowling 5 when the doors 10 are in the closed position. The butterflies 15 are fastened to the rear end of the link rods 11. Preferably, the butterflies 15 form an integral part of the link rods 11, but they may also be attached, for example by welding. In the open, or partly open, position, as shown in FIGS. 4B, 4C and 4D, the butterflies 15 remain in the prolongation of the link rods 11 to which they are fastened.

In FIG. 4D, the doors 10 are completely open. The rear part 14 of said doors 10 is housed inside the cowling 5, is closes off the flow channel 9 for the thrust flow. The air flow is then directed by the internal wall 17 of the doors 10 out of the cowling 5, toward the front of said cowling 5, thus forming a reverse flow.

The doors 10 may be opened and closed by actuation means according to the disclosed embodiments, which are located on the doors 10. A control system makes it possible for example to actuate the actuation means from the cockpit of the aircraft. The means for actuating the doors are advantageously located on the link rods 11 so that any one actuation means can actuate two adjacent doors 10 simultaneously. Moreover, the actuation means located on the link rods 11 do not disturb the flow of the thrust flow when the thrust reverser 2 is in the closed position. Since a door 10 is linked to the cowling 5 by two link rods 11, it is actuated by two different actuation means. A central door 10 of the thrust reverser 2 is therefore actuated by two different actuation means, each of these actuation means moreover actuating one of the two doors 10 adjacent this central door 10. The term "central door" is understood to mean a door flanked by two other doors, on the same side or flank of the cowling.

In the embodiment shown in FIGS. 4A to 4D, the actuation means are cylinders 18, such as pneumatic or hydraulic cylinders. A cylinder 18 extends along the length of a link rod 11. In the closed position (FIG. 4A), the link rods 11, and therefore also the actuation means 18, 19, 20, are completely covered by the doors 10. The piston of the cylinder 18 is attached to a pantograph, that is to say to two actuating rods 19 and 20, each actuating rod 19, 20 being moreover fastened to a door 10. The actuating rods 19, 20 are therefore fastened to two different adjacent doors 10. Thus, by means of the pantograph 18, 19, any one cylinder 18 can push or pull two adjacent doors 10, preventing any differential opening and closing of the two adjacent doors 10. The path, the length, the diameter and the arrangement of the pipework for supplying the cylinders 18 are designed so as to balance the intake and delivery pressure drops of each cylinder 18.

In another embodiment of the control system according to the disclosed embodiments, as shown in FIGS. 5 and 6, it is possible to use only a single cylinder 21. The single cylinder 21 is for example housed between the internal wall and the external wall of the cowling 5. The cylinder 21 may actuate two half-rings 22 and 23, which each follow a semi-circumference of the nacelle 5 so that the axis of the half-rings 22, 23 is coincident with the axis of the engine. The half-rings 22, 23 are for example on the link rods 11 between the internal wall and the external wall of the cowling 5. The rings 22 and 23 are mounted so as to rotate about the axis of the engine by means of circumferential rails. The cylinder 21 actuates two connecting rods 27 and 28, each linked to one end 25, 26 of a half-ring 22, 23. The point of attachment between the connecting rods 27, 28 of the cylinder 21 and the half-rings 22 and 23 may be located in the articulation axis for opening the reverser cowling, thereby dispensing with the need to disconnect said connecting rods 27, 28 when said cowling is opened. Guide rollers 24 fastened to the link rods 11 convert the translational movement of the connecting rods 27, 28 into a rotational movement of the half-rings 22, 23. The doors 10 are articulated on the half-rings 22, 23 via connecting rods that transfer the movement of the half-rings 22, 23 to the doors 10.

FIG. 7 shows a partial longitudinal section of the cowling 5 and of the air flow channel 9 at the location of a door 10 of the thrust reverser 2 according to the disclosed embodiments. A multiple connecting rod 29 extends along the length of the cowling 5, along a link rod 11 to which it is fastened. The multiple connecting rod 29 is entirely concealed by the closed door 10.

It may be seen in FIG. 8 that the door 10 is in the open position, so that the rear part 14 of said door 10 closes off the air flow channel 9. The multiple connecting rod 29 is articulated to the half-ring 22 and to the link rod 11 and the door 10. The door 10 is pushed by one branch of the multiple connecting rod 29 so that it pivots at the point of the pivot 12 so that the front part 13 stands out from the cowling 5 and the rear part 14 of the door 10 penetrates into the air flow channel 9.

When the doors 10 have to be closed, the cylinder 21 returns the half-rings 22, 23, to the rest position, which half-rings then bring the multiple connecting rods 29 into the rest position and these in turn bring the doors 10 to which they are linked into the closed position.

Since the multiple connecting rods 29 are fastened to the half-rings 22, 23 they are all actuated simultaneously, ensuring all the doors 10 are actuated simultaneously. A multiple connecting rod 29 may be linked via two different branches to two adjacent doors 10. Thus, any one actuation means, formed by a multiple connecting rod 29, makes it possible to open and close two adjacent doors 10 simultaneously. Of course, a multiple connecting rod 29 may actuate only a single door 10. In this case, each link rod 11 has two multiple connecting rods 29 lying side by side, parallel to each other, each actuating a door 10.

The actuation means according to the disclosed embodiments provide synchronized actuation of two adjacent doors 10. In addition, the actuation means according to the disclosed embodiments do not disturb the flow of the thrust flow in the channel 9 when the doors 10 are in the closed position, since they are not located in said channel 9.

The doors 10 of the thrust reverser 2 according to the disclosed embodiments may be easily provided with an acoustic treatment so as to preserve the sound environment. For example, the doors 10 are covered with a honeycomb material, which traps the sound waves in the cells of the honeycomb so that they can be dissipated within the cells.

An aircraft may be fitted with one or more nacelles according to the disclosed embodiments.

The invention claimed is:

1. An aircraft nacelle comprising:
   a cowling defining an internal volume and having leading and trailing ends relative to the direction of travel;
   an engine housed in the internal volume of the cowling;
   an annular flow channel for a secondary thrust flow, constructed between the engine and the cowling;
   a thrust reverser positioned at the trailing end of the cowling for movement between two positions, a first in which the thrust reverser forms the trailing end of the cowling where the trailing end includes internal and external flow surfaces and a second in which the thrust reverser blocks the annular flow channel and directs the secondary thrust flow out of the cowling towards the leading end for forming a reverse flow from only the secondary thrust flow; said thrust reverser further comprising;
   a plurality of static link rods constructed in the cowling, spaced about a circumference of the cowling and extending towards the trailing end;
   a plurality of doors, each mounted on adjacent static link rods, at the trailing ends of said static link rods, for pivoting movement thereon about an axis transverse to the static link rods where a trailing end of each of the plurality of doors forms the trailing end of the cowling including the internal and external flow surfaces at a tip of the trailing edge; and
   an actuator system operatively connected to respective doors to pivot the doors between the first and second positions.

2. The nacelle as claimed in claim 1, wherein said static link rods are covered by the doors in the closed position.

3. The nacelle as claimed in claim 2, wherein said static link rod extends between an internal wall and an external wall of the cowling.

4. The nacelle as claimed in claim 2, wherein at least one actuator of the actuator system is mounted on a static link rod.

5. The nacelle as claimed in claim 1, wherein at least one static link rod links two adjacent doors.

6. The nacelle as claimed in claim 1, wherein each door has a leading part and a trailing part constructed so that the dimension of said leading part extending along the circumference of the cowling and perpendicular to the axis of the engine is greater than the corresponding dimension of said trailing part.

7. The nacelle as claimed in claim 1, wherein the system of actuators further comprises an actuator positioned in each of the static link rods and operatively connected to the pair of adjacent doors mounted on an individual static link rod, wherein each of the doors may be pivoted by two actuators.

8. The nacelle as claimed in claim 7, wherein each actuator comprises a double-acting cylinder having two actuating rods, one end of each rod being fastened to a door.

9. The nacelle as claimed in claim 1, wherein the actuator system includes rotary means capable of rotating about the axis of the engine, actuation means being mounted on the rotary means so as to actuate the doors on rotation of the rotary means.

10. The nacelle as claimed in claim 1, wherein the doors are provided with an acoustic coating.

11. The nacelle as claimed in claim 1, wherein the thrust reverser comprises eight doors.

12. The nacelle as claimed in claim 1, wherein the thrust reverser comprises sixteen doors.

13. The nacelle as claimed in claim 1, wherein the doors are identical to one another and are interchangeable.

14. An aircraft comprising at least one nacelle as claimed in claim 1.

* * * * *

UNITED STATES PATENT AND TRADEMARK OFFICE
CERTIFICATE OF CORRECTION

| | | |
|---|---|---|
| PATENT NO. | : 7,784,735 B2 | Page 1 of 1 |
| APPLICATION NO. | : 11/994205 | |
| DATED | : August 31, 2010 | |
| INVENTOR(S) | : Herve Marche | |

It is certified that error appears in the above-identified patent and that said Letters Patent is hereby corrected as shown below:

On the Title Page, Item (57) Abstract, line 9, delete "lease" and insert -- least --, therefor.

Signed and Sealed this
Third Day of January, 2012

David J. Kappos
*Director of the United States Patent and Trademark Office*